Patented June 13, 1933

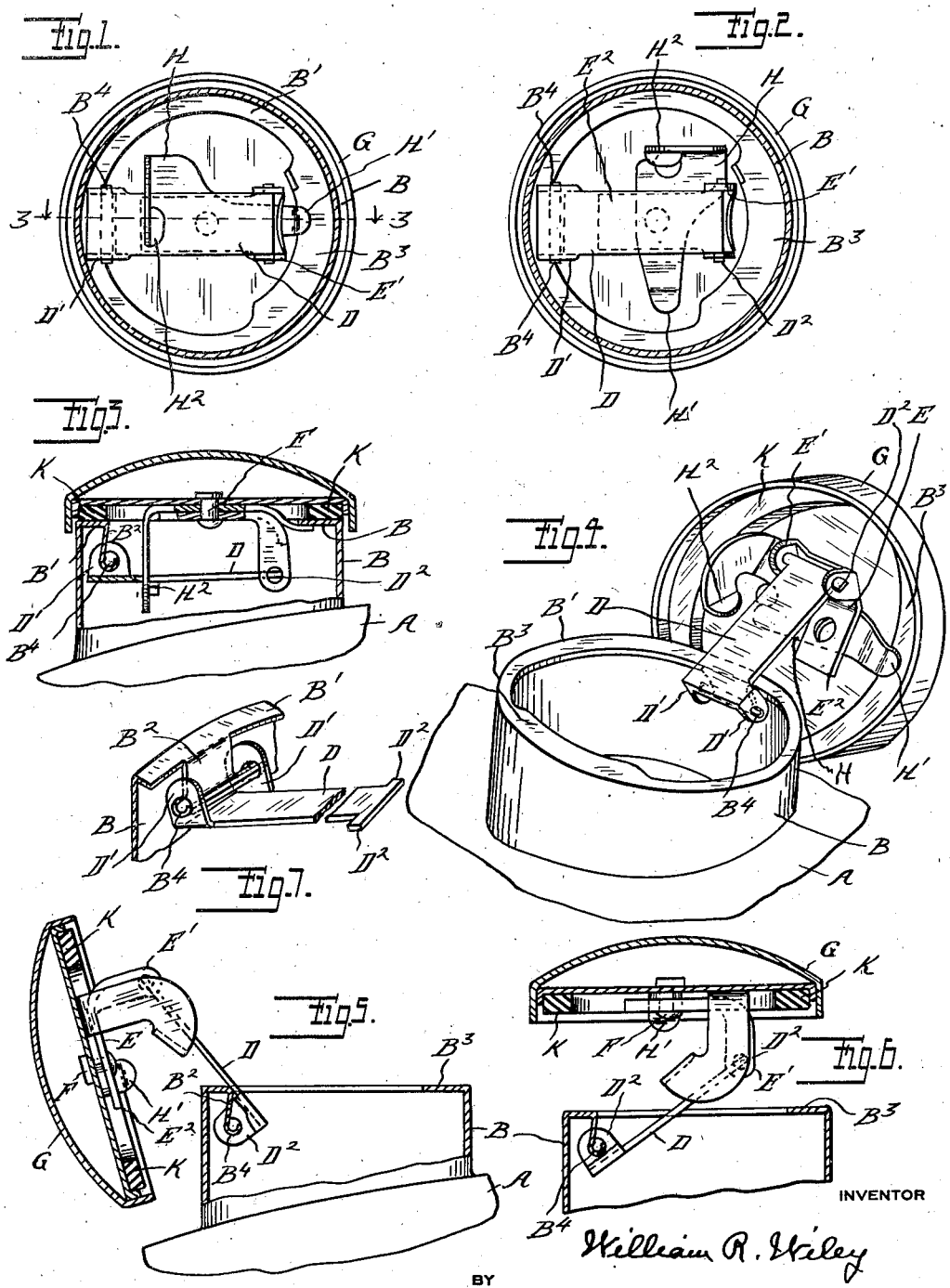

1,914,227

UNITED STATES PATENT OFFICE

WILLIAM R. WILEY, OF DETROIT, MICHIGAN

CLOSURE FOR TANKS OR RADIATORS

Application filed October 31, 1931. Serial No. 572,381.

This invention relates to a closure for the filling necks of motor vehicle radiators, gasoline tanks, and the like, and has for its object an improved organization of parts, which, while sacrificing none of the advantages inherent in the present screw-threaded means for securing the cap to the top of the filling neck, provides for a permanent attachment of the cap thereto so that it can neither be carelessly lost when unscrewed, nor easily stolen. My improved structure not only meets these requirements, but as well so positions itself relatively to the filler neck when in unseated position therefrom as to be entirely out of the way of any hose nozzle or similar-fluid delivery medium which it may be desired to insert in the open top of the filler neck.

In the drawing:

Figure 1 is a plan view of the under face of the cap, with its attached and cooperating parts in locking position.

Figure 2 is a similar plan view of the under face of the cap, showing the parts in unlocked position as regards the manually effected rotation of the cap on the filler neck.

Figure 3 is a sectional elevational view of the cap and its filler neck, taken along the line 3—3 of Figure 1, and looking in the direction of the arrows there shown.

Figure 4 is a perspective of the filler neck and of my improved closure cap, the latter being shown in displaced position from the former and at one side thereof.

Figure 5 is a sectional elevational view similar, as regards the position from which it is taken, to Figure 3, but showing the closure cap in the thrown-to-one-side position shown in Figure 4.

Figure 6 is a similar sectional elevational view, showing the filler neck and closure cap in the relative positions occupied by them when the displacing movement of the cap therefrom or its replacement thereon is about half completed.

Figure 7 is a fragmentary perspective of a part of the cap-anchoring link, designed to bring out a preferred method of effecting the hinged anchorage of the lower end of the link to the filler neck.

A indicates fragmentarily the wall of a motor vehicle radiator or of a gasoline tank, from which rises tahe filler neck B. The top edge of this neck is preferably inbent somewhat, as indicated at B', partly in order to form a curved, non-cutting edge surface upon which the washer K of the filler cap G may rest, but as well to provide through perhaps 90° of its extent a further inbent flange $B^3$ of slightly spiralled inclination for cooperative interlocking with an attached part of the filler cap G which will be later referred to.

Generally opposite to this spirally inclined portion $B^3$, the flange B' is also formed with a further projecting ear or tongue $B^2$, whose ends $B^4$ are formed into the pintled or trunnioned form shown most clearly in Figure 7, for hinging or pivoted engagement through the overbent ears D' of the link D. The opposite end of this link is similarly pivotally secured as by projecting points $D^2$ to apertured ear pieces E' which form the end portions of the bracket or securing clip E, which is secured in the approximate center of the under face of the cap G by means of the rivet F. Of course ordinary pivot pins could be used as hinging pintles in place of the integral ears $D^2$ and $B^4$ here shown, but the cost of such a construction would be greater and such an assemblage could more easily be separated if the theft of the cap were intended.

Also similarly secured to the cap G by the rivet F is the central portion of the contoured resilient clip piece H, one end of which as H' is adapted to frictionally engage under the spirally flanged part $B^3$ when the cap is forced down upon the top of the filler neck and turned, though spaced therefrom by the washer K.

The other end of the resilient clip H is formed with the over-engaging hook piece $H^2$, which, when the cap is in the position of closure on the neck, which has just been described, engages under the then substantially horizontal face of the link D and cooperatively with the engagement of its companion clip point H' with the flange section $B^3$ already referred to, serves to hold the parts in similarly assembled relation, subject to the intentional spacing of the cap from the top edge of the filler neck by the washer K. Either of these clip elements alone would probably be sufficient to hold the cap in position of closure with respect to the filler neck, but the use of both of them, H' and H², also serves to reduce the possibility of rattling of the parts to a minimum.

Upon reference to Figures 4, 5, and 6, it will be noted that after the holding clip points have been disengaged from the flange B³ and the under face of the link D respectively by manual turning of the cap G, the subsequent lifting of the cap, combined with the pivotal anchorage thereof which the link D affords, results in the movement of the cap as a whole in a direction generally lengthwise of the extent of the link D about the pivoting ears B² as a center thus throwing the cap increasingly to one side of the extended bounding lines of the filler neck, until, when the end of this swinging movement is reached, the cap and indeed all but the inner end of the link D lie wholly outside thereof, causing no more interference with the free access of a hose nozzle to the top of the filling neck than would be the case if the cap were of the threaded-on-variety and had been removed entirely. The reverse of the movement to that just described as regards the cap G and the link D in turn results in the swing of the cap over the filler neck until it is in practically axial alignment therewith when a combined downward pressure and twisting movement exerted by the hand causes the locking engagement of the hooped points H' and H², of the flange B³, and the underface of the link D respectively in the manner already described. While my experience leads me to the belief that it is preferable to form the link D relatively rigid and the clip H relatively resilient, it should of course be understood as within the intended scope of this disclosure to form the link D relatively resilient, as from a single strap of sheet metal, and the terminally hooked anchorage clip H relatively rigid.

It should also be noted that the end E² of securing clip E, projecting as it does well beyond the rivet center F, serves, by engagement against the clip H, to limit the twisted throw of the cap G, so that it cannot be turned further than is necessary to effect the engagement with and disengagement from the flange B³ and the under face of the link D by the resilient ends H' and H² respectively of the clip H. Furthermore, this securing clip, as regards the attachment thereto of the upper end of the link D functions as well as a structural part of the cap G, enabling the link D to be made of such a length, extending as it does across the rivet center F, that the cap may be thrown entirely clear of the filler neck space when opening of the neck for insertion of a filling hose nozzle is desired; this would not be the case if the upper end of the link D were attached directly to the cap at the rivet center F.

What I claim is:

1. In combination with a filler neck provided with selectively positioned projections on its inner surface, a link member pivotally attached at one end to one of said projections in a position to extend therefrom beyond the axial center of said filler neck, a filler cap with which the other end of said link member is operatively connected, and an anchorage clip supported by said filler cap, adapted, when said cap is limitedly rotated about its axis and that of the filler neck, to engage with one of its ends another of the recited projections on the inner surface of the filler cap and to engage with the other of its ends under the under surface of said link, thereby locking the cap in closure position over the top of said filler cap.

2. In combination with a filler neck, a cap adapted to close the same, means for limitedly permitting relative unseating movement of said cap relatively to said filler neck, comprising a link connected at one of its ends to the side of said filler neck and at the other end with the under side of said cap at an operative point located on the opposite side of the common axial center of said filler neck and of said cap when positioned thereon from that point on said filler neck to which the first-named end of the link is connected, and an anchorage clip supported by said cap in position to be moved into operative engagement with one side of the filler neck and with the under surface of said link when the cap is in position of closure over the top of said filler neck.

3. In combination with an interiorly flanged filler neck, a tethered closure therefor comprising a cap, a plurality of clip members carried on the under side thereof, and a link member pivotally connected at one end to the filler neck and at its other end to the end of one of said clip members, whereby when the cap is in position of closure over the filler neck said link is positioned substantially transversely of the neck and is interlockingly engageable by one end of the other of said clip members upon the manually induced rotative movement of said cap about its axis, the other end of said clip at the same time operatively engaging under an adjacent portion of the flange on the filler neck.

4. The combination, with an inwardly flanged filler neck, of a cap whose displaceable attachment thereto is desired, a link hingedly connected at one end to the inside of said filler neck, a bracket member secured to the under face in position of limited mobility with respect thereto and with which the other end of said link member is connected, and an anchorage clip also supported from the under side of said cap and adapted to become terminally interlocked with said link and with said flanged neck upon manually induced rotative movement of said cap when seated upon the top edge of said flanged neck.

5. A tethered tank closure, comprising, in combination with a filler neck and a cap adapted to seat upon the top edge thereof, an anchorage clip attached to the under side of said cap and a link pivotally connected at one end with an interiorly facing side of said filler neck and linked at its other end to the under side of said cap, said link being adapted to be clampingly seized by one end of said anchorage clip contemporaneously with the effected operative engagement of the other end thereof with an adjacent portion of the filler neck when the cap is lowered to position of closure with respect to the latter.

In testimony whereof I sign this specification.

WILLIAM R. WILEY.